United States Patent [19]

Schrader et al.

[11] Patent Number: 4,991,902
[45] Date of Patent: Feb. 12, 1991

[54] FOLDING TOP COVERING FOR A FOLDING TOP OF A VEHICLE

[75] Inventors: Jürgen Schrader, Stuttgart; Klaus Claar, Gechingen; Harald Koppenstein, Filderstadt; Kurt Gramer, deceased, late of Nagold, all of Fed. Rep. of Germany, by Margot Gramer, executor

[73] Assignee: Daimler-Benz AG, Fed. Rep. of Germany

[21] Appl. No.: 478,438

[22] Filed: Feb. 8, 1990

[30] Foreign Application Priority Data

Feb. 8, 1989 [DE] Fed. Rep. of Germany ....... 3903680

[51] Int. Cl.⁵ ............................................. B60J 7/12
[52] U.S. Cl. .................................. 296/107; 296/108; 296/116
[58] Field of Search ............... 296/107, 108, 116, 117, 296/118

[56] References Cited

U.S. PATENT DOCUMENTS 2,580,337 12/1951 Votypka .............................. 296/107
4,626,021 12/1986 Muscat ................................ 296/107

FOREIGN PATENT DOCUMENTS 8205999 7/1982 Fed. Rep. of Germany ...... 296/107

Primary Examiner—Robert R. Song
Attorney, Agent, or Firm—Evenson, Wands, Edwards, Lenahan & McKeown

[57] ABSTRACT

The invention relates to a folding-top covering for a folding top of a vehicle, which is stretched onto a supporting folding-top structure and which comprises two releasably interconnected folding-top covering portions, arranged one behind the other along the length of the vehicle and which are joined in a plane of width of the folding top by being connected to a connecting element by a strip-shaped fastening portion. When the folding-top covering is damaged, the particular folding-top covering portion can be simple and economically exchanged. The folding-top covering is divided along a bow of the folding top and the strip-shaped fastening portion of the folding-top covering parts is clamped to the bow.

9 Claims, 3 Drawing Sheets

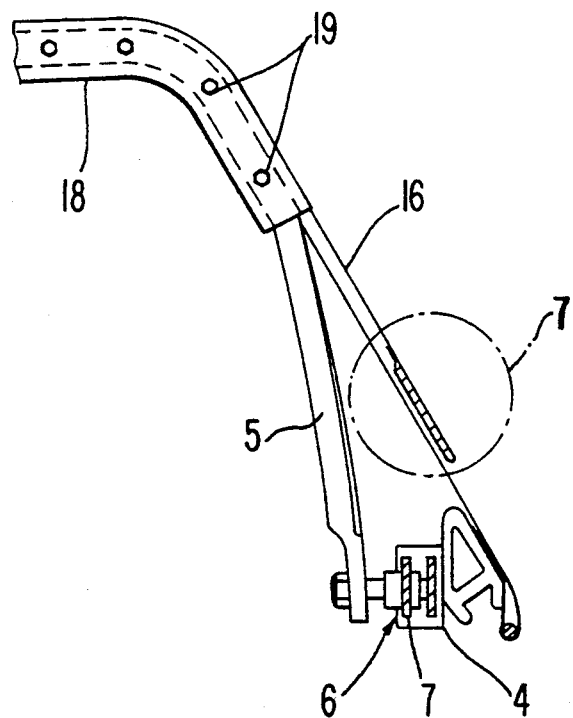
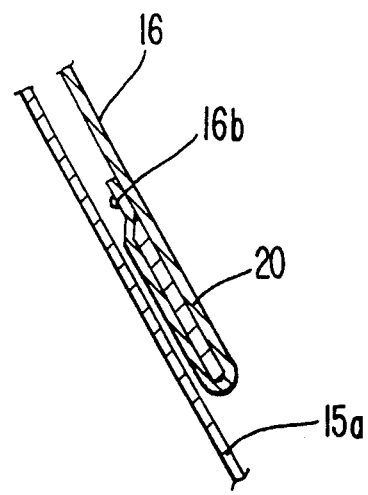
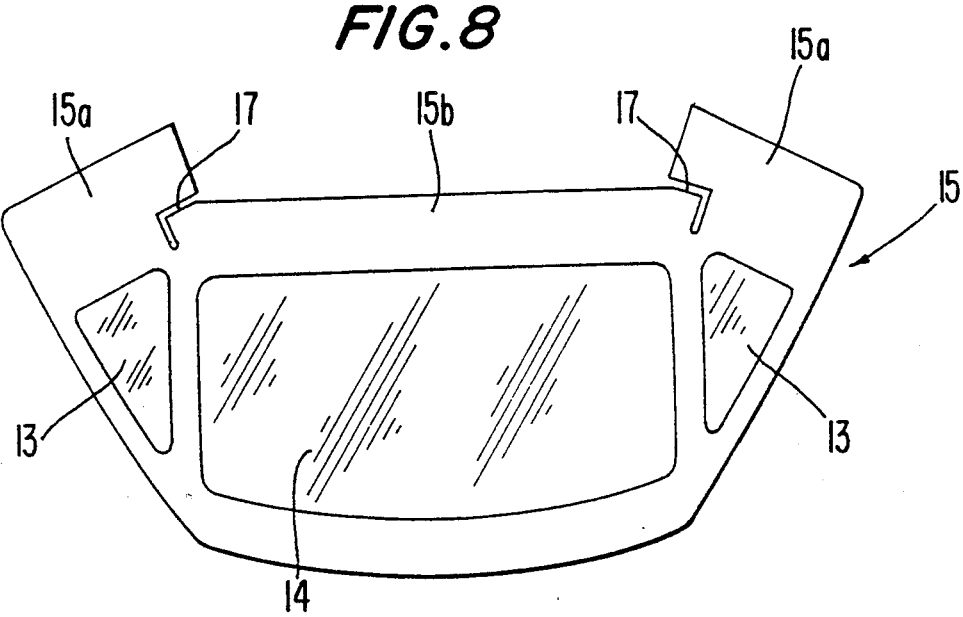

FOLDING TOP COVERING FOR A FOLDING TOP OF A VEHICLE

BACKGROUND AND SUMMARY OF THE INVENTION

The invention relates to a folding-top covering for a folding top of a vehicle. The covering is stretched onto a supporting folding-top structure and comprises two releasably interconnected folding-top covering portions arranged one behind the other along the length of the vehicle and which portions are joined in a plane of width of the folding top by being connected to a connecting element by a strip-shaped fastening portion.

A folding-top covering divided in a plane of width of a folding top is known from German Utility Model No. 82 05 999.3. Because the covering is divided into two portions, when damage occurs to the covering material affecting only one part of the folding-top covering there is the possibility of exchanging only the damaged folding-top covering portion.

In comparison with an exchange of the entire folding-top covering, this would make it possible to achieve considerable savings in terms of repair costs.

However, if one of the folding-top covering portions were exchanged, the slide fastener serving as an easily releasable connecting element would also have to be exchanged, since it is subjected to a relatively high tear-out stress. This also requires that the two top portions have fastener tapes coordinated exactly with one another in terms of their meshing engagement. Also the two fastener tapes of the slide fastener are each stitched firmly to a fastening portion of the associated folding-top covering portion in order to obtain a proper sealing and at the same time a tension-resistant joining connection.

To exchange the slide fastener, therefore requires a time-consuming separating operation and a necessary stitching operation. Such an exchange thus goes beyond the facilities of a conventional specialized motor-vehicle repair shop in terms of equipment stock.

For the reasons explained, the object on which the invention is based, is to improve a releasable connection between two folding-top covering portions of a folding top, to the effect that it is possible to exchange one of the folding-top covering portions of the folding top relatively quickly and cost-effectively by customary workshop means.

According to the invention, the solution for achieving this object is obtained by having the folding-top covering divided along a bow of the folding top and provided with a strip-shaped fastening portion clamped to the bow. Thus the bow, in addition to performing its supporting function for the folding-top covering, also retains the two folding-top covering portions. The retention function ensures that the bow is supported transversely at the folding-top covering, with the result that, when the folding-top covering is stretched, the bow is properly positioned in the longitudinal direction of the folding-top covering.

Since the fastening portions are connected to the bow by means of clamping devices, the clamping advance of which can be exerted via conventional tensioning screws or the like, it is possible for the folding-top covering portions to be exchanged by means of a simple tool.

An especially easy joining connection of the folding-top covering portion to the bow is obtained if the folding-top material is pressed between a circumferential face of the bow and a corresponding clamping rail over its entire fastening length.

The screw-fastening means of the clamping rail can be used as tensioning screws. The fastening strip can rest as a surface seal against the clamping face of the bow.

So that cylindrical tube form of the bow can be preserved, the clamping rail can be designed as a clamping shell which partially surrounds the circumference of the bow.

With the clamping shell surrounding approximately half the bow circumference, a clamping fit of the fastening strips is obtained, which is secure against tearing out while at the same time justifiable clamping forces are maintained.

To prevent a portion of the folding-top covering portion that is looped around the longitudinal edge of the bow shell from wearing through, the longitudinal edge of the shell (as seen in cross-section) should be rounded with as uniform a radius as possible. Preferably, the two fastening strips are held with a joint clamping fit, since only a single clamping rail is then required.

Since the rear-wall part of a folding-top covering of convertible folding tops undergoes relatively high wear, especially because of the flexible window panes arranged in it, it is to be considered particularly expedient to divide the folding-top covering along the corner bow of the folding top so that all window panes are located in one portion of the top-covering. As regards a folding top, saddle-mounted on the vehicle body, it would be possible for the folding-top covering to be divided over the entire length of the corner bow, if the corner bow were secured pivotably to the vehicle body via brackets offset towards the interior. Then the corner bow could extend along the circumferential contour of the folding top in the side-wall region too.

In contrast to this, where folding tops retractable into an associated folding-top box are concerned, it is necessary for a length portion of the bow flanks (a portion is located near the folding joints) to be movable in relation to the folding-top covering.

To obtain this movability, the roof division of the folding-top covering along the corner bow merges into a longitudinal portion in the side-wall region of the folding top.

Sealing is preferably obtained in the longitudinally divided joining region of the folding-top covering by virtue of a generous height overlap of the two folding-top covering portions, since there is no need for any additional connection between the corresponding folding-top covering portions. Under the influence of longitudinal tensioning forces in the folding-top material in the overlap region, the folding-top covering portions rest sealingly on one another. In order to stabilize a lower closing edge of the outer folding-top covering portion, a pull band made of rubber or the like can be provided.

Other objects, advantages and novel features of the present invention will become apparent from the following detailed description of the invention when considered in conjunction with the accompanying drawings.

BRIEF DESCRIPTION OF THE DRAWINGS

FIG. 6 shows a vertical section according to the line VI—VI in FIG. 2, FIG. 7 shows a vertical section through a lower closing edge of the front folding-top covering portion on an enlarged detail, and FIG. 8 is a developed plan view of the rear-folding top covering part.

DETAILED DESCRIPTION OF THE DRAWINGS

Figure 1:
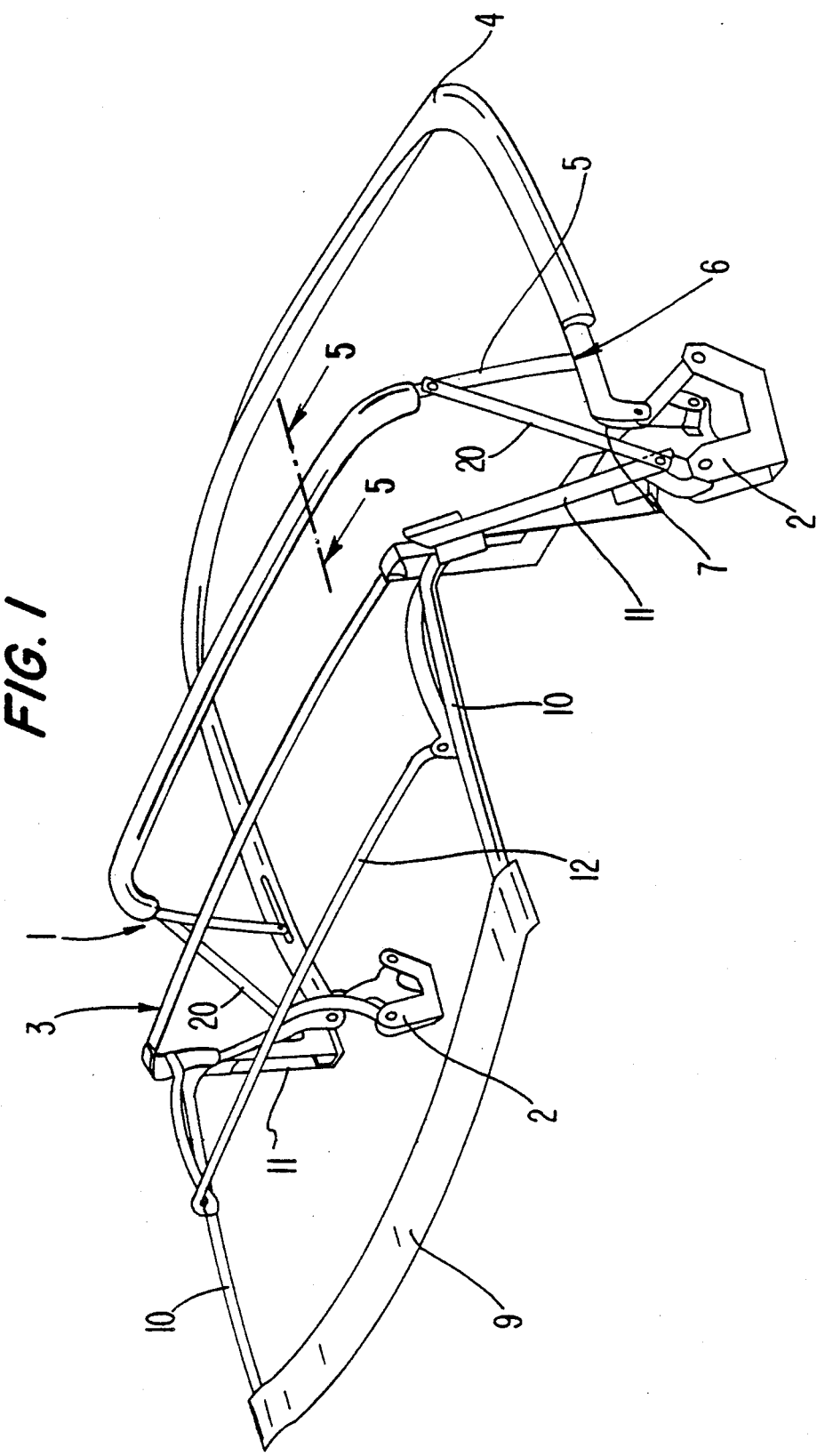
FIG. 1 shows an oblique perspective view of a folding-top frame structure of a convertible.

FIG. 1 shows a general view of a folding-top frame structure 1 which is intended to be mounted on a body (not shown) of a convertible The folding-top frame structure 1 is centrally and pivotably secured at both sides of the vehicle to bearing brackets 2 which are arranged countersunk in the vehicle body walls in front of the lateral legs of an associated folding-top box. By shifting of a main bow 3, the folding-top structure 1 can fold up in a known way under the mechanical positive control of all the structure elements and can retract into the open folding-top box configuration shown in FIG. 1. So that: the middle regions of the main bow 3, a roof-skin retention hoop 4, and a corner bow 5 secured to the lateral legs of the roof-skin retention hoop 4 all can be compactly bundled together during the operation of retracting the folding-top structure 1, the roof-skin retention hoop 4 is displaced forwards in relation to the corner bow 5. This relative displacement is obtained by a rotary sliding articulation 6 between the bow flanks of the corner bow 5 and the lateral legs of the roof-skin retention hoop 4. This displacement occurs in conjunction with an activation of the corner-bow advance, independently of the roof-skin retention hoop 4, by separate drive levers 7.

Figure 2:
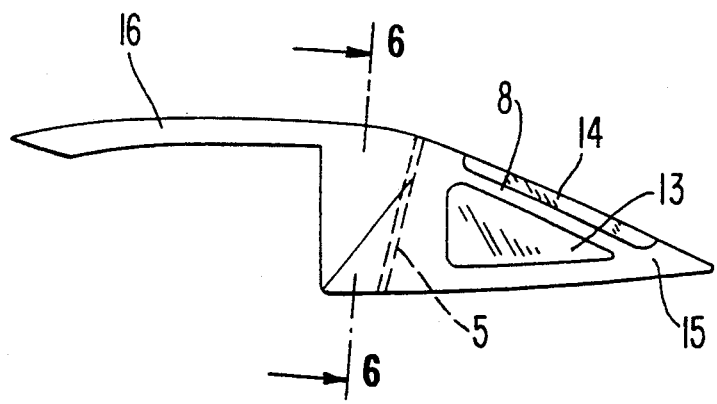
FIG. 2 shows a diagrammatic side view of a folding-top covering stretched onto the folding-top structure according to FIG. 1.

A folding-top covering 8 is stretched over the folding-top structure 1 illustrated in the closed erected state in FIG. 2. The folding-top covering 8 is held along its circumference at the front of the vehicle by a roof member 9; is held above the side windows by lateral roof frames 10; is held at the rear edge of the side windows by roof-skin retention rails 11 mounted on the folding-top columns of the main bow 3; and is held at the rear and laterally at the bottom by the roof-skin retention hoop 4. To ensure a dimensionally stable and taut fit of the folding-top covering 8; an intermediate bow 12, the middle region of the main bow 3, and a middle region of the corner bow 5 all rest against the folding-top covering 8 under an upwardly directed prestress.

Window apertures are cut out in the rear region of the folding-top covering 8 and are closed by means of rear-window panes 13 and 14 consisting of transparent film.

The folding-top covering 8 is divided into two portions 15, 16 along the width direction of the vehicle and in front of the rear windows 13 and 14, so that the rear folding-top covering portion 15 (equipped with the rear windows 13 and 14) can be exchanged independently of the front folding-top covering portion 16.

The joining line of the folding-top covering 8, which is hardly noticeable when the folding-top covering portions 15 and 16 are interconnected, extends along the middle width region of the vehicle adjacent to the central bow portion of the corner bow 5 and thereafter merges into a joining region which extends in the longitudinal direction of the vehicle and which is located in the side-wall region of the folding-top covering 8.

Figure 4:
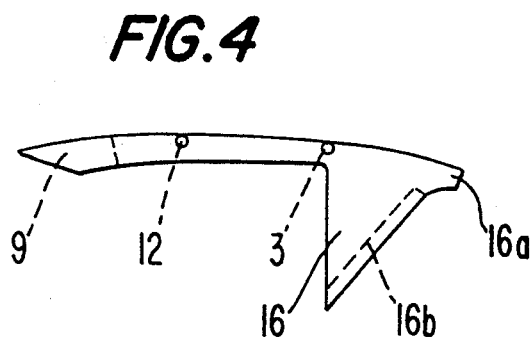
FIG. 4 shows a separate view of a front folding-top covering portion of the folding-top covering.
Figure 3:
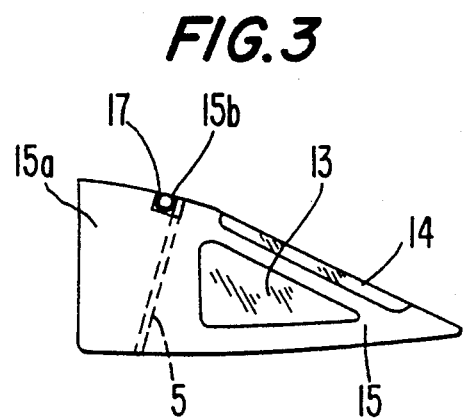
FIG. 3 shows a separate view of a rear folding-top covering portion of the folding-top covering.

So that the division of the folding-top covering 8 is mirror-symmetrical in relation to the longitudinal mid-plane of the vehicle and in order that the design of the two folding-top covering portions 15 and 16 (in the connecting region) can be seen more clearly, the folding-top covering portion 15 and the folding-top covering portion 16 are shown separately from one another in FIG. 3 and in FIG. 4 respectively. The side wall of the rear folding-top covering portion 15 has a forward extension portion 15a that can be fastened directly to the associated roof-skin retention rail 11 of the main bow 3. The width (height) of this extension portion 15a is calculated so that its lower closing edge is aligned with the lower closing edge of the folding-top covering portion 15, while its upper closing edge reaches as far as the roof surface. In the roof-surface region, the folding-top covering portion 15 is extended forwards. This extension consisting of a narrow strip-shaped fastening portion 15b which projects forwards beyond the middle region of the corner bow 5. The dimension of the fastening portion 15b projecting beyond the longitudinal mid-axis of the middle region of the hollow-cylindrical corner bow 5 corresponds to half the length of the circumference of the corner bow 5.

The fastening portion 15b can be wound round the circumference of the corner bow 5 over an upper central part 1 of the bow flank. To accommodate this, the folding-top covering portion 15 is equipped on both sides (starting from the corners between the fastening portion 15b and the upper closing edge of the length portion 15a) with an L-shaped indentation 17 which is first directed downwards and which then extends rearwards where it terminates in the middle of the associated bow flank of the corner bow 5. The length of the fastening portion 15b is thus limited at one end by the indentation 17, which determines the length of the joining line.

Figure 5:
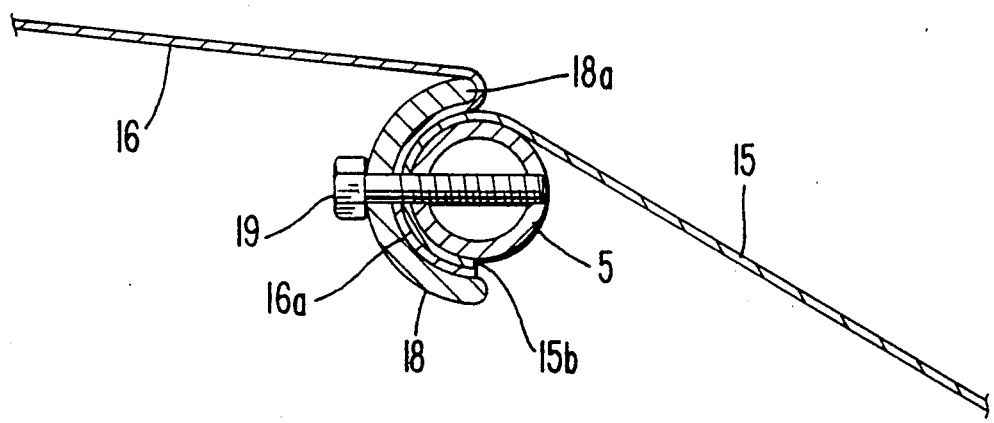
FIG. 5 shows a horizontal section along the line V—V in FIG. 1 when the top is in place on the frame.

In relation to the installed position of the corner bow 5, the front folding-top covering portion 16 is likewise extended by means of a fastening portion 16a in accordance with the longitudinal extent of the joining line. It too has an approximately U-shaped length over the width extent of the folding-top covering portion 16. The width of fastening portion 16a is slightly larger than that of the fastening portion 15b. In the side-wall region, the fastening portion 16a starts from an oblique rear closing edge of the folding-top covering portion 16, which in assembly extends centrally relative to the bow flank and merges into the fastening portion 16a. The adjoining lower closing edge of the folding-top covering portion 16 in the side-wall region extends in a straight line and obliquely downwards and forwards as far as the front closing edge, which is fastened to the associated roof-skin retention rail 11. To allow a clamp-fastening of the fastening portions 15b and 16a to the opposite center region of the corner bow 5, a clamping shell 18 is provided to extend continuously over the length of the joining line. This clamping shell 18, to be seen in its full extent in FIG. 1 and follows the shape of the bow extension in the middle region and the adjoining extension of the bow flanks. Thus the shell 18 is bent in an approximately U-shaped manner. As seen in cross-section (FIG. 5), the clamping shell 18 has the form of a half-annulus, with the wall thickness being essentially constant over the entire length of the clamping shell 18. The rearwardly directed inner circumference of the clamping shell 18 is designed as a clamping face with a radius slightly larger than the outer radius of the corner bow tube 5.

In the installed position (FIG. 5), the clamping face of the clamping shell 18 surrounds the front half of the circumference of the opposite corner bow 5 with the two fastening portions 15b and 16a being clamped between the shell 18 and corner bow 5. The fastening portion 15b rests directly against the circumferential face of the corner bow 5, while the fastening portion 16a rests directly against the inner circumference of the clamping shell 18. The two fastening portions 15b and 16a therefore rest on one another with a joint clamping fit. At the same time, in the transitional region from the front folding-top covering portion 16 to the fastening portion 16a, the covering portion 16 rests against a longitudinal edge of the clamping shell 18 extending above the bow 5 and is folded therearound at an angle of almost 180°. To prevent the folding-top material from wearing through at this longitudinal edge of the clamping shell 18, the latter is rounded to form a deflecting edge 18a. The radius of the deflecting edge 18a corresponds to half the thickness of the clamping shell 18.

The clamping shell 18 is retained against the corner bow 5 by a plurality of tensioning screws 19 distributed over the length of the clamping shell 18. The screws 19 tighten the clamping shell 18 against the corner bow 5. The shank of each of these tensioning screws 19 is designed as lead-through screw and passes through a passage bore cut out from the clamping shell 18 in the vicinity of its longitudinal mid-axis. The screws extend through orifices in the cover fastening portions 15b, 16a that are aligned with the passage bore and also extend through at least one associated fastening bore located in the corner bow 5. The bore in the corner bow 5 is equipped with a corresponding internal thread In an axial direction of the lead-through screws 19, which is diametral in relation to the annular cross-section of the corner bow 5, substantially uniform clamping forces are obtained over the width of the fastening portions 15b and 16a (of the vehicle) during the clamping advance of the clamping shell 18.

As can be seen in conjunction with FIG. 6, the triangular lobe of the front folding-top covering portion 16 overlaps the length portion 15a located under it with a generous height overlap. Since the lower oblique closing edge of this lobe lies on a straight connecting line between the roof-skin retention rail 11 and that length portion of the fastening portion 16a fastened to the corner-bow flank, a watertight and draught-proof joining region can be guaranteed in the side-wall region of the closed folding-top by means of longitudinal tensioning forces.

So that the lower closing edge of the lobe of the folding-top covering portion 16 rests over its entire length permanently sealingly against the overlapped length portion 15a, it can additionally be held taut by longitudinal tensioning means.

Here, the longitudinal tensioning means is a rubber band 20 of slim rectangular cross-section and which is stretched between the roof-skin retention rail 11 and the associated flank of the corner bow 5. As can be seen from FIG. 7, the rubber band 20 is arranged in a wrap-around portion 16b of the front folding-top covering portion 16. The wrap-around portion 16b adjoins the lower closing edge and is somewhat wider than the rubber band 20. The wrap-around portion 16b is stitched (at its edges) to the folding-top covering portion 16 to provide a longitudinal guide for the rubber band 20. This allows for a displacement of the rubber band 20 relative to the loop-shaped wrap-around 16b in response to longitudinal stretching of the same. Since the rubber band 20 extends with its wide sides parallel to the side-wall plane, it takes up only a small constructional depth in the side wall. At the transition from the length portion 15a (widened in the form of a lobe) there is only a relatively slim step which follows the step caused by the clamping shell 18 along the joining line in a aesthetic way.

Over the circumference, the folding-top covering 8 is connected in a concealed manner to the associated folding-top frame structure 1 in a way which is already known and which is therefore not explained in detail. Screw, rivet, press-stud, loop or clamping connections and combinations of these are possible as connecting techniques suitable for connecting the folding top to the frame structure 1.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A folding-top covering, for a folding top of a vehicle, on which the covering is stretched onto a supporting folding-top frame structure, comprising two releasably interconnected folding-top front and back covering portions arranged one behind the other along a longitudinal direction of the vehicle;

the two covering portions being joined in a plane along a width of the vehicle by being connected to a connecting element by strip-shaped fastening portions;

the folding-top covering being divided into its two portions along a bow of the folding top frame;

the strip-shaped fastening portions of the folding-top covering portions being clamped to the bow by the connecting element; and the fastening portions of the folding-top covering portions being held between a circumferential face of the bow and a clamping rail of the connecting element, which is braced relative to the bow, wherein the bow has a cylindrical circumferential face; and the clamping rail is a clamping shell having a clamping face curved concentrically relative to a circumference of the bow.

2. A folding-top covering according to claim 1, wherein the clamping shell surrounds approximately half the circumference of the bow.

3. A folding-top covering according to claim 1, wherein a longitudinal edge of the clamping shell extends above the bow when the folding top is erected; and wherein the longitudinal edge is rounded to form a deflecting edge.

4. A folding-top for a folding top of a vehicle, in which the covering is stretched onto a supporting folding-top frame structure comprising two releasably interconnected folding-top front and back covering portions arranged one behind the other along a longitudinal direction of the vehicle;

the two covering portions being joined in a plan along a width of the vehicle by being connected to a connecting element by strip-shaped fastening portions;

the fold-top covering being divided into its two portions along a bow of the folding top frame bow being a corner bow with bow flanks and which is pivotably secured at ends of its bow flanks to a roof-skin retention hoop;

the strip-shaped fastening portions of the folding-top covering portions being clamped to the bow by the connecting element;

the joining plane of the two fastening portions taking place along a middle region of the bow and a part length region of the bow flanks adjacent to this middle region;

and in the two folding-top covering portions being joined in a side-wall region of the folding top and extending along the side wall in a longitudinal direction of the vehicle, wherein the rear folding-top covering portion is equipped on both sides with side length portions in a side-wall region of the vehicle folding top;

the side length portions are fastened to the outside of the bow flank so as to extend forward of the vehicle and past the bow flank; and the side length portions are overlapped over a region of height of the folding-top covering by widened length portions of the front folding-top covering portion which is stretched between the bow flank and an adjacent main bow.

5. A folding-top covering according to claim 4, wherein a lower closing edge of the widened length portion of the front folding-top covering portion extends obliquely upwards, as seen from front to rear of the vehicle.

6. A folding-top covering according to claim 4, wherein the widened length portion of the front folding-top covering portion is stabilized in the region of its lower closing edge by a resilient means.

7. A folding-top covering according to claim 5, wherein the widened length portion of the front folding-top covering portion is stabilized in the region of its lower closing edge by a resilient means.

8. A folding-top covering according to claim 6, wherein the resilient means extends in a wrap-around area of the widened length portion of the front folding-top covering portion.

9. A folding-top covering according to claim 7, wherein the resilient means extends in a wrap-around area of the widened length portion of the front folding-top covering portion.

* * * * *